Figure 1:
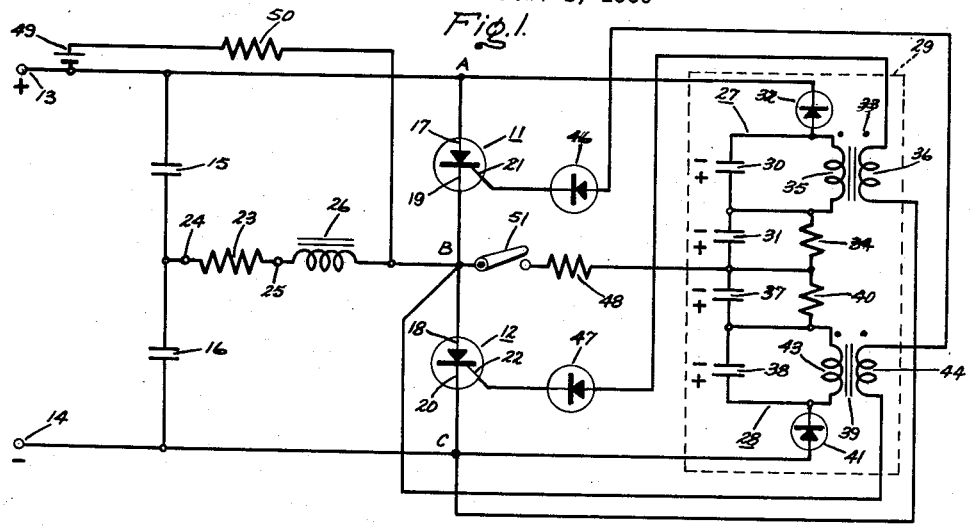

Feb. 4, 1964

L. L. GENUIT 3,120,634

CONTROLLED RECTIFIER INVERTER CIRCUIT

Filed Feb. 1, 1960

Inventor:
Luther L. Genuit,
by Henry J. Morciniak
Attorney.

United States Patent Office 3,120,634
Patented Feb. 4, 1964

3,120,634
CONTROLLED RECTIFIER INVERTER CIRCUIT
Luther L. Genuit, Danville, Ill., assignor to General
Electric Company, a corporation of New York
Filed Feb. 1, 1960, Ser. No. 6,018
12 Claims. (Cl. 321—45)

This invention relates to an inverter circuit for converting direct current into alternating current and more particularly it relates to an improved series inverter circuit employing semiconductive controlled rectifiers.

The type of inverter circuit to which this invention relates includes one or more capacitors, an inductor and two serially connected semiconductive controlled rectifiers which alternately charge and discharge the capacitors through the inductor and load circuit. The controlled rectifiers are fired at precise intervals by a firing circuit. It is an essential requirement of such firing circuits that a fixed time delay be provided for the controlled rectifier which was previously in a conducting state to return to a blocking state before the other controlled rectifier is fired.

Relaxation oscillators utilizing unijunction transistors have proven to be dependable firing circuits for series inverter circuits employing semiconductive controlled rectifiers. In such firing circuits, the fixed time delay can be readily provided by selecting suitable circuit constants. An inverter circuit employing relaxation oscillators utilizing unijunction transistors is described in my copending application entitled "Controlled Rectifier Inverter Circuits."

Although this circuit has been found to be satisfactory in operation, it requires the use of two unijunction transistors. The added cost of the unijunction transistors in an inverter circuit is a drawback in many commercial applications where cost considerations are controlling factors. Thus, there is a need for a firing circuit in a controlled rectifier series inverter that does not require the use of unijunction transistors in the firing circuits.

Accordingly, a general object of the invention is to provide an improved controlled rectifier inverter circuit for producing an alternating current output from a direct current supply.

A more specific object of this invention is to provide an improved inverter circuit having a firing circuit in which a firing pulse is provided after a predetermined time delay.

It is an object of this invention to provide an improved inverter circuit employing semiconductive controlled rectifiers triggered by a firing circuit driven by the commutation voltages of the semiconductive controlled rectifiers.

A further object of the invention is to provide an improved inverter circuit which is not susceptible to misfiring when operated at voltages above 250 volts direct current.

These and other objects and advantages of the present invention are achieved by an inverter circuit in which a first and a second semiconductive controlled rectifier are connected in circuit with a first and second firing circuit. The firing circuits include at least one firing capacitor which is charged during the commutation period of the first controlled rectifier and then discharged to cause a current to flow in a reverse direction when the polarity reverses due to the damped oscillation set up in the tuned network. After a fixed delay as determined by the capacitance and inductance of the tuned portion of the first firing circuit, the second controlled rectifier is fired. In a similar manner, the voltage across the second controlled rectifier during its commutation period is utilized to energize the second firing circuit and to charge a pair of capacitors and cause a current flow in the tuned network of the second firing circuit. During the first reversal of polarity that occurs during the damped oscillation that follows the excitation of the tuned portion of the circuit, the first controlled rectifier is fired after a fixed delay.

In another aspect of this invention, instead of employing the commutation voltages of the controlled rectifiers, a current sensing network is employed to supply a substantially square wave of voltage to the firing circuits of the invention. The network includes a current transformer and a bridge rectifier connected across the direct current power supply and the secondary of the current transformer. The rectifier connections cause the transformer to operate at a fixed voltage over a wide range of current variations since the transformer presents a high impedance until the voltage across the secondary reaches the direct current input voltage level. The voltage of the transformer remains fixed at this level as current is fed back into the direct curent supply input terminals.

According to the present invention, an inverter circuit employing semiconductive controlled rectifiers is provided with a starting arrangement wherein one of the controlled rectifiers is initially fired from the direct current supply input and the operation of the circuit initiated without need for an auxiliary source of power.

Figure 2:
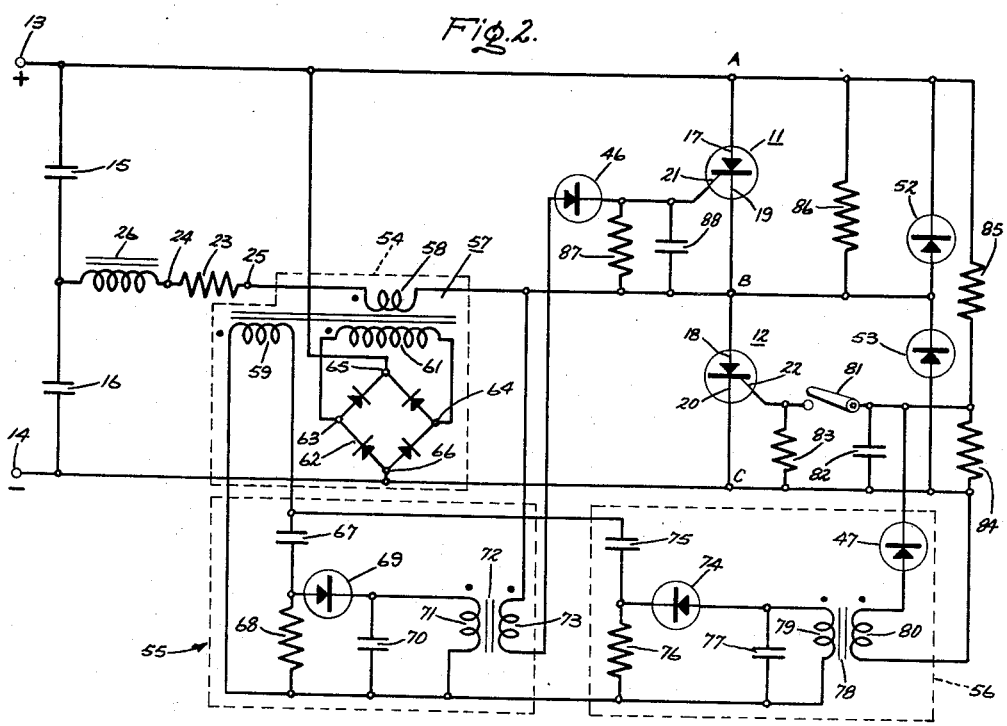

The subject matter which I regard as my invention is set forth in the appended claims. The invention itself, however, together with further objects and advantages thereof may be understood by referring to the following description taken in connection with the accompanying drawing in which:

FIG. 1 is a schematic circuit diagram of a series inverter circuit in which the invention is embodied; and FIG. 2 is a schematic circuit diagram illustrating another embodiment of the invention.

The series inverter circuits shown in FIGS. 1 and 2 include two controlled rectifiers 11, 12 which may be any suitable type of controlled rectifier having an adequate current carrying capacity, such as silicon controlled rectifiers. The controlled rectifiers 11, 12 are connected in series across a pair of direct current input terminals 13, 14. The positive terminal 13 and the negative or grounded terminal 14 connect the circuit to a direct current supply source (not shown) which may be a rectified commercial alternating current source.

Controlled rectifiers 11, 12 are PNPN junction semiconductors, each having three terminals, anodes 17, 18, cathodes 19, 20 and gate electrodes 21, 22, respectively.

It is to be understood that the controlled rectifiers 11, 12 can be switched into a high conduction state at an anode-to-cathode voltage less than the breakover voltage by supplying a low level gate-to-cathode current. This characteristic makes it possible to use the controlled rectifiers 11, 12 to control a substantially large current flow by a low power signal supplied to the gate electrodes 21, 22.

At point A the anode 17 of the controlled rectifier 11 is connected in circuit with the positive input terminal 13. The cathode 19 of controlled rectifier 11 and the anode 18 of the controlled rectifier 12 are connected at point B. At point C the cathode 20 of the controlled rectifier 12 is connected in circuit with the negative input terminal 14.

A pair of serially connected capacitors 15, 16 are connected across the direct current input terminals 13, 14. It will be appreciated that the circuit of the invention can be operated with only one of the capacitors 15, 16 in conjunction with a single pair of controlled rectifiers or two pairs of controlled rectifiers connected in a bridge circuit. However, for the same power delivered to the load, when only a single capacitor is used with a single pair of controlled rectifiers, the current pulses drawn from the direct current supply are twice as large and occur half as often. Where a single capacitor is used in the circuit of the invention, it must therefore have twice the capacitance. It is preferable therefore to employ two capacitors when a single pair of controlled rectifiers is employed, since the number of pulses drawn from the direct current supply are doubled and the demands on the power source are not as stringent.

Representing the resistive portion of the load is a resistor 23 which is shown connected to a pair of output terminals 24, 25. An inductor 26 is connected in series with the resistor 23. It will be appreciated that the inductance provided by the inductor 26 may not be required in the circuit or it may be eliminated in part if the overall reactance of the load circuit is inductive.

Controlled rectifiers 11, 12 are triggered by a pair of symmetrical firing circuits 27, 28 which, as shown in FIG. 1, are enclosed by a rectangle 29 formed by dashed lines. The firing circuit 27 includes a pair of serially connected capacitors 30, 31, a diode 32, a reactor 33, and a resistor 34. The reactor 33 provides direct current isolation of the firing circuit 27 and alternating current coupling with the gate electrode 22 of the controlled rectifier 12. A primary winding 35 and a secondary winding 36 of the reactor 33 are connected so that when a current is flowing out of the upper end of the primary winding 35 an induced current flows out of the upper end of the secondary winding 36 as indicated by the dots shown in the FIG. 1.

The firing circuit 28 has the same general circuit configuration as firing circuit 27 and includes two serially connected firing capacitors 37, 38, a reactor 39, a resistor 40 and a diode 41. The reactor 39 provides direct current isolation of the firing circuit 28 and alternating current coupling with the gate electrode 21 of controlled rectifier 11. A primary winding 43 and a secondary winding 44 of the reactor 39 are so arranged that when the current flows out of the upper end of the primary winding 43, an induced current flows out of the upper end of the secondary winding 44.

Diodes 46, 47 are provided in the gate circuits of the controlled rectifiers 11, 12, respectively, to prevent the inverse voltage from being applied between cathode and gate during the reverse part of the cycle. The diode 32 is connected in circuit with the input terminal 13 and the firing circuit 27 to block downward current flow into the firing circuit 27 from the positive terminal 13 of the direct current supply. Similarly, the diode 41 is connected in circuit with the input terminal 14 and firing circuit 28 to block downward current flow into firing circuit 28. It will be noted that firing circuits 27, 28 are operative only during a commutation period of controlled rectifiers 11, 12 because of the blocking action of the diodes 32, 41 at all other times.

In the embodiment of the invention illustrated in FIG. 1, the firing circuits 27, 28 have a tuned network comprising the inductors 33, 39, which provide the inductive reactance, and the capacitors 30, 38, which provide the capacitive reactance. The charging current for the capacitors 30, 38 and 31, 37 flows through a resistor 48 which provides an impedance to the charging current flow.

In order to start the operation of the inverter circuit shown in FIG. 1, an auxiliary power source 49, such as a battery, is employed to provide the potential across points A and B, necessary to energize firing circuit 27 and to trigger controlled rectifier 12. The auxiliary power source 49 is connected in series circuit relationship with a resistor 50 which is a point in the circuit intermediate between the inductor 26 and point B. A switching means 51 which, as shown in FIG. 1, is a single throw switch causing starting potential to be impressed across firing circuit 27.

A principal difference between the circuit arrangement shown in FIGS. 1 and 2 is that in FIG. 2 a pair of power diodes 52, 53 are connected in reverse parallel connection with the controlled rectifiers 11, 12. The basic circuit configuration employing diodes in reverse parallel connection is claimed and described in my copending application filed on the same date and entitled "Controlled Inverter Rectifier With Diodes Connected in Reverse Parallel Relationship" and assigned to the same assignee as the present application. This specific feature is not a part of this invention.

The diodes 52, 53 carry the inverter current during the commutation period of the controlled rectifiers 11, 12 and limit the commutation voltage to the low forward voltage drop of the diodes 52, 53. As a consequence, the commutation voltage is approximately zero and cannot be used to drive the firing circuits. Accordingly, FIG. 2 shows a preferred embodiment of the invention in which a current sensing network 34 coupled with the output portion of the inverter circuit is utilized to drive firing circuits 55, 56. The current sensing network is shown enclosed in the dashed lines as shown in FIG. 2.

The current sensing network 54 includes a transformer 57 having a primary winding 58, the secondary windings 59, 61 and a bridge rectifier 62, having its input terminals 63, 64 connected across the secondary winding 61 and its output terminals 65, 66 connected across the direct current supply input terminals 13, 14. As shown in FIG. 2, the transformer 57 is essentially a current transformer. The bridge rectifier 62 connected across the secondary winding 61 causes the transformer 57 to operate at a fixed voltage over a wide range of current variations. A significant advantage of this arrangement is that an approximately square wave voltage is supplied by the secondary winding 59 to firing circuits 55, 56 of this invention.

As shown in FIG. 2, the firing circuits 55, 56 are enclosed in dashed rectangles. The firing circuit 55 includes a capacitor 67 serially connected with a resistor 68, a diode 69, and a capacitor 70 connected across a primary winding 71 of a reactor 72. The gate electrode 21 is coupled with the firing circuit 55 by a secondary winding 73 of the reactor 72. The diode 69 permits a unidirectional current to flow to the tuned portion of the firing circuit 55 comprising the capacitor 70 and the reactor 72. The primary and secondary windings 71, 73 are connected so that when current flows out of the upper end of the primary winding 71, an induced current flows out of the lower end of the secondary winding 73.

The firing circuit 56 has the same general configuration as the firing circuit 55 except that a diode 74 is connected in reverse position as compared with the diode 69 in firing circuit 55. Thus, the diode 74 will permit a current flow in firing circuit 56 when the diode 69 is blocking the current flow in firing circuit 55. Firing circuit 56 includes a serially connected capacitor 75 and resistor 76, the diode 74 and a tuned network comprising a capacitor 77 and a transformer 78 having a primary winding 79 and a secondary winding 80 connected so that when current flows out of the lower end of the winding 79, an induced current flows out of the upper end of winding 80.

The starting arrangement of the inverter circuit shown in FIG. 2 differs from the circuit of FIG. 1 in that the circuit is started directly off the direct current power supply. The by-pass rectifier 52 prohibits the steady-state charge of the capacitors 15, 16 to be maintained at a level such as to hold point B positive with respect to point A prior to starting the inverter.

The starting arrangement of the inverter circuit shown in FIG. 2 includes a switch 81, a capacitor 82, a resistor 83 connected across the capacitor 82, serially connected resistors 84, 85 and a resistor 86. The ohmic value of the resistors 84 and 85 determine the voltage to which the capacitor 82 will charge when the switch 81 is in the open position, the resistors 84, 85 serving as a voltage divider. During the starting condition of the circuit, the resistor 86 in effect serves to short out controlled rectifier 11 and to cause the direct current voltage input which is applied to the terminals 13, 14 to appear across the silicon controlled rectifier 12 which is the rectifier that is initially triggered to start the operation of the circuit. Also, the resistor 86 causes most of the applied voltage to be impressed across the capacitor 16. Thus, the mid-point B is brought to a voltage which is only slightly negative with respect to the positive side of the direct current supply. It was found that this condition facilitates starting of the inverter circuit.

The capacitor 82 and the resistor 83 are connected across the gate input of the controlled rectifier 12 in order to reduce the impedance at the gate terminal and to suppress voltage spikes that might appear in the circuit. Similarly, a resistor 87 and a capacitor 88 are connected across the gate input of the controlled rectifier 11 to reduce the impedance at the gate terminal and to suppress any voltage spikes which might appear in the gate circuit.

The operation of the inverter circuits shown in FIGS. 1 and 2 will now be described. Referring first of all to the circuit shown in FIG. 1, this circuit is started by energizing the input terminals 13, 14 with a direct current supply of the polarity indicated. With the switch in the open position, the firing circuits 27, 28 are not energized. The capacitors 15, 16 are charged by the auxiliary voltage source 49 and point B thereby becomes positive with respect to point A. The magnitude of the positive potential of A with respect to B is substantially equal to the voltage of the auxiliary power source 49. When the starting switch 51 is closed, this positive potential appears across the firing circuit 27 and the normal operation of the inverter circuit is initiated. A current now flows through the resistor 48 and charges the capacitors 30, 31. Capacitors 30, 31 are charged to a voltage having the polarity as indicated by the plus and minus signs shown in FIG. 1. No charging current flows into firing circuit 28 because of the blocking action of diode 41. The current flow through the tuned portion of the firing circuit 27 comprising the capacitor 30 and reactor 33 causes a damped oscillation to occur in this circuit. This damped oscillation causes a polarity reversal of the voltage across the primary winding 35 and secondary winding 36 of the reactor 33 which results in a pulse of current that flows out of the top end of winding 36 and triggers controlled rectifier 12. Any remaining charge on the capacitors 30, 31 is drained off through the primary winding 35 of the reactor 33 or through the resistor 34. When controlled rectifier 12 is in a conducting state, it discharges the capacitors 15, 16 through a load which is represented by its resistive portion as resistor 23 connected across the output terminals 24, 25. During this discharge period energy is supplied to the inverter by the direct current supply in the form of a charging current flowing from terminal 13 through capacitors 15, 16 to terminal 14. The magnitude of this charging current is equal instantaneously to one half the value of the discharge current flowing through controlled rectifier 12. This current flow constitutes the first half cycle of the alternating current supplied to the load terminals. The main current flow through the resistor 23 and the inductor 26 sets up an oscillation which causes the voltage of the point B to swing negative with respect to point C by the end of the first half of the cycle at which point there is a tendency for the oscillatory current to reverse, and the controlled rectifier 12 reverts to a blocking state. Since point B is now negative with respect to point C, charging current flows through diode 41 and charges the capacitors 37, 38 in the polarity indicated. The current flow also causes a damped oscillation to occur in the tuned portion of the firing circuit 28 comprising the capacitor 38 and reactor 39. When the first polarity reversal of the voltage across the primary winding 43 occurs because of the damped oscillation, a pulse of current is supplied to the controlled rectifier 11. Any remaining charge on the capacitors 37, 38 is drained off by the primary winding 43 of the transformer 39 or the resistor 40.

When controlled rectifier 11 is fired, the second half cycle of the alternating current supply is initiated with the main current now flowing from the positive terminal 13 of the direct current supply through controlled rectifier 11, the point B, the inductor 26, the resistor 23 and to the capacitors 15, 16, thereby discharging capacitor 15 and charging capacitor 16. Again, energy is supplied to the circuit from the direct current supply in the form of a charging current to capacitors 15, 16 equal instantaneously to one half the magnitude of the current carried by controlled rectifier 11. Approximately at the end of the second half cycle, point B swings positive with respect to the point A and a positive voltage again appears across the firing circuit 27, and the capacitors 30, 31 are again charged and discharged thereby beginning another cycle.

In order to insure that one of the controlled rectifiers will not be fired before the other rectifier has returned to a blocking state, the firing circuits 27, 28 should provide for a fixed delay between the instant that the firing circuit is energized and before the firing circuit triggers a controlled rectifier. For silicon controlled rectifiers of the type employed in the hereinafter described exemplifications of the invention, the recovery time is about five microseconds. To provide a good margin of safety, it is preferable that the firing circuit provide a fixed delay of at least 20 microseconds.

The firing circuits 27, 28 employing the hereinafter described circuit constants successfully operated the inverter circuit shown in FIG. 1. The following constants of the principal components of the firing circuits 27, 28 are given by way of example and are not intended to limit the invention in any way:

Capacitors 30, 31, 37, 38____ .3 microfarad.
Resistors 34, 40_____ 2700 ohms.
Resistor 48_____ 45 ohms.
Diodes 32, 41, 46, 47_____ 1N93 diodes.
Reactors 33, 39—
   Primaries 35, 43_____ 71 turns of .0142 inch wire.
   Secondaries 36, 44_____ 71 turns of .0142 inch wire.
   Core_____ Arnold Engineering "C" core, model AM-2 with total air gap of 10 mils (5 mils per core leg).

The fixed time delay provided by the firing circuit 27, 28 with the foregoing components was approximately 40 microseconds. When the .3 microfarad capacitors were replaced by .1 microfarad capacitors, the time delay was reduced to 20 microseconds. Thus, this firing circuit has the advantage that a fixed delay of very short duration can be readily provided by varying the capacitance which will permit a controlled rectifier to return to a blocking state before the other controlled rectifier is fired. Further, it is to be noted that a firing circuit in accordance with the present invention does not utilize any expensive components such as transistors.

A preferred embodiment of the present invention is illustrated in the circuit of FIG. 2, and the operation of this circuit will now be more fully described. With the switch 81 in the open position and a direct current voltage impressed across the input terminals 13, 14, the capacitor 82 will be charged up to a predetermined value depending upon the ratio of the ohmic value of the resistors 84, 85. The operation of the inverter circuit is initiated by closing the switch 81 and thereby discharging the capacitor 82 to cause a current to flow to the gate electrode 22 of the controlled rectifier 12. It is to be noted that resistor 86 also aids in starting because the resistor 86, which is a relatively high resistance (30,000 ohms in the hereinafter described exemplification of the invention) causes most of the direct current input voltage to appear across controlled rectifier 12, which is the rectifier utilized in starting the inverter circuit. Further, the use of the resistor 86 in the circuit causes the capacitor 16 to be charged while the capacitor 15 is substantially free of any charge. This feature of the circuit makes it possible to readily start the circuit since the point B is brought to a voltage which is only slightly negative with respect to point A.

When controlled rectifier 12 is initially fired, the capacitor 16 discharges. The path of current flow is through the inductor 26, the resistor 23, the primary winding 58 of the transformer 57, point B, the controlled rectifier 12 and to the negative or grounded side of the circuit at terminal 14. The transformer 57 offers a high impedance until the voltage across the secondary winding 61 reaches the input direct current level. The voltage of the transformer 57 remains fixed at this level as the current is fed back to the terminals 13, 14 through the output connections 65, 66 of the bridge rectifier 62. Thus, it will be seen that a substantially square wave of voltage appears across the secondary winding 59. A current is induced in the secondary winding 59, the direction of current flow being out of the left end of the winding 59 as shown in FIG. 2. The diode 69 blocks this current flow to the firing circuit 55. However, diode 74 admits the current to the firing circuit 56, thereby charging the capacitors 75, 77. Since the capacitor 77 and reactor 78 comprise a tuned circuit, a damped oscillation occurs and the polarity of the voltage across the reactor 78 is reversed after one half cycle of the oscillation and a current pulse is induced in secondary winding 80 which is not blocked by the diode 74. This current pulse occurs shortly after the initiation of the first half cycle (time delay set to provide controlled rectifier recovery time) and would fire controlled rectifier 12 had it not already been fired by the starting network. At the end of the first half cycle the current through controlled rectifier 12 goes to zero. At this instant point B is negative with respect to point C by virtue of the charges accumulated by capacitors 15 and 16, and the current through the LRC (L denoting inductance, R the resistance and C the capacitance) network reverses flowing from point 14 through diode 53 to point B, through primary 58 of transformer 57, through resistor 23, reactor 26, capacitor 16 and back to point 14. A current is now induced in secondary winding 59 of transformer 57 flowing out of the right end of winding 59. The diode 74 now blocks this current from firing circuit 56, but diode 69 admits it to firing circuit 55 to charge capacitors 67, 70. In the tuned circuit comprised of capacitor 70 and reactor 72, a damped oscillation follows and the first reversal of polarity permits a current pulse to flow out of the lower end of secondary winding 73 of reactor 72 through diode 46 to the gate 21 of controlled rectifier 11. This current pulse fires controlled rectifier 11. When controlled rectifier 11 is fired, the path of the main current flow is now from the positive input terminal 13 through point A, controlled rectifier 11, point B, the primary winding 58, the load resistor 23, the inductor 26 and to the capacitors 15, 16. Current is no longer carried by the by-pass rectifier 53 because the conduction of controlled rectifier 11 switches point B to the potential of point A less the forward anode-to-cathode drop of controlled rectifier 11. The current through controlled rectifier 11 builds up to a peak and falls off to zero in the form of a damped half sine wave. At this instant, point B is positive with respect to point A and a reverse current begins to build up in the LRC load circuit. This reverse current flows through the primary winding 58 of the transformer 57 and causes an induced secondary current to flow in a direction opposite to the current flow during the previous half cycle. The diode 69 blocks this current from entering firing circuit 55. However, diode 74 now permits the current to flow through firing circuit 56. This current flow results in an initial voltage across the secondary winding 80 of reactor 78 which is of such polarity that would cause a current flow out of the lower end of the winding 80. The diode 47, however, blocks such a current flow. Since the capacitor 77 and reactor 78 comprise a tuned oscillatory circuit, a damped oscillation occurs thereby reversing the polarity of the voltage across the primary winding 79 and a current pulse is supplied to the gate of the controlled rectifier 12 and fires it after a predetermined time interval. It will be appreciated that this circuit affords positive protection against both of the controlled rectifiers 11, 12 being fired simultaneously by the firing circuits 55, 56 since the energization of the firing circuits 55, 56 depends upon a reversal of the main current flow and since the circuits 55, 56 provide a fixed time delay to allow one controlled rectifier to return to a blocking state before the other is fired.

One advantage of the firing circuit of FIG. 2 over that of FIG. 1 is that it appears less susceptible to misfiring, particularly at high direct current supply voltages. This may be attributed to the location of the firing circuit of FIG. 2 in series with the load as opposed to the location of the firing circuit of FIG. 1 in parallel with the controlled rectifiers where it is subject to the effects of the fast switching of high voltages across the network as controlled rectifiers are turned on and off. It is possible that transient spikes are capacitively coupled to gate terminals causing inappropriate firing.

While the present invention is useful as a means for stepping up direct current voltages, it may also be used in applications where it is desired to convert a direct current supply to a high frequency alternating current supply. By way of example, the inverter circuit of FIG. 2 was used to provide a 2500 cycle alternating current supply to ten 8-foot power groove lamps. The direct current voltage was obtained from a three phase voltage rectifier connected to a three phase 220 volt alternating current line through variable autotransformers. It was found that the only factor limiting the number of lamps that could be supplied was the current rating of the controlled rectifiers. The following circuit constants were used and they are listed herein by way of example and not in order to limit the invention thereto:

Controlled rectifiers 11, 12 _____ C35B silicon controlled rectifier.
Diodes 46, 47, 69, 74 _____ 1N93 diodes.
Diodes 52, 53 _____ 4JA411DH1AD1 rectifiers.
Transformer 57—
    Core _____ Arnold Engineering "C" core, Model AL-8.
    Primary winding 58 _____ 17 turns of .045 by .100 inch wire.
    Secondary winding 59 _____ 66 turns of .0126 inch wire.
    Secondary winding 61 _____ 560 turns of .010 inch wire.
Resistors 83, 87 _____ 47 ohms, 2 watts.
Capacitors 82, 88 _____ .01 microfarad.
Resistor 85 _____ 270,000 ohms, 2 watts.
Resistor 84 _____ 10,000 ohms, 2 watts.
Capacitors 67, 75 _____ .1 microfarad.
Resistors 68, 76 _____ 1500 ohms, 2 watts.
Capacitors 70, 77 _____ .2 microfarad.
Reactors 72, 78—
    Core _____ Arnold Engineering "C" core, Model AM-2.
    Primary windings 71, 79 __ 70 turns of .0142 inch wire.
    Secondary windings 73, 80 _ 70 turns of .0142 inch wire.

The operating voltage and current at the terminals 13, 14 were 237 volts and 9.2 amperes, respectively, when the inverter circuit was used to operate the ten 8-foot power groove lamps at a frequency of 2500 cycles. It was found that by using capacitors 70, 77 having a capacitance of .2 microfarad, a fixed firing time delay of 33 microseconds was obtained.

It will be understood that the component values and specific type of components which have been described herein are intended for illustrative purposes only and that these may be changed or varied without departing from the spirit and scope of the invention. While particular embodiments of the invention have been described herein, it will be apparent that many modifications may be made. It is to be understood, therefore, that I intend by the appended claims to cover all such modifications that fall within the true spirit and scope of the invention.

What I claim as new and desire to secure by Letters Patent of the United States is:

1. An inverter circuit comprising a pair of direct current input terminals, a capacitor connected in circuit with said input terminals, a pair of controlled rectifiers, a load circuit having a resistive portion and an inductive portion, means connecting said input terminals with said controlled rectifiers and said load circuit to provide a current path for energizing said load circuit with half cycles of current flow of opposite direction, said capacitor being charged and discharged during each cycle, a firing circuit having a first and second tuned network, each of said tuned networks comprising a firing capacitor and a reactor coupled with one of said controlled rectifiers, said firing capacitor being discharged by the reversal of polarity resulting from the damped oscillation occurring in said tuned network and providing a delayed pulse to the previously nonconducting controlled rectifier to fire it after a predetermined delay after cessation of current flow in the other controlled rectifier, and starting means for initially triggering one of said controlled rectifiers.

2. A firing circuit for providing a current pulse to trigger a controlled rectifier comprising a pair of input connections, a first capacitor, a resistor connected in series circuit relationship with said first capacitor across said input connections, a second capacitor connected in series circuit relation with said first capacitor, a reactor having a primary and a secondary, said second capacitor being associated in tuned circuit relationship with said reactor, a diode connected in circuit with said input connections to permit a unidirectional current to charge said capacitors when said input connections are energized, said secondary and primary of said reactor being adapted so that when the initial current flowing in said primary is reversed due to the damped oscillation resulting from said tuned circuit relationship a firing pulse is induced in the secondary for triggering said controlled rectifier, said firing pulse being induced after a predetermined interval measured from the instant said input connections are energized.

3. An inverter circuit comprising: a pair of controlled rectifiers; a pair of direct current input terminals; a capacitor connected in circuit with said input terminals; a pair of output terminals for connection with a load circuit having a resistance and an inductance; circuit means connecting said input terminals with said controlled rectifiers to provide a current flow in one direction during one half cycle and in an opposite direction during the other half cycle at said output terminals, said capacitor being charged and discharged during each cycle; a first and second firing circuit, each having a pair of firing capacitors, a resistor and a reactor, each of said reactors and one of said firing capacitors being associated in tuned circuit relationship and one of said reactors coupling said firing circuit with one of said controlled rectifiers and the other of said reactors coupling said firing circuit with the other of said controlled rectifiers; a current sensing transformer having a primary and a secondary, said primary being connected in series circuit relationship with said output terminals and said secondary being connected in circuit with said firing circuit to alternately supply a charging current to one of said pairs of firing capacitors in response to the current reversals across said primary, said firing circuit providing a delayed current pulse to the previously nonconducting one of said controlled rectifiers to trigger it at the end of a predetermined delay after the other controlled rectifier has been turned off.

4. An inverter circuit as set forth in claim 3 in which said current sensing transformer includes a second secondary, a rectifying means connected in circuit with said secondary and said input terminals, said transformer providing substantial impedance to the flow of current in said primary until the voltage across said secondary equals the voltage impressed across said input terminals, 5. An inverter circuit as set forth in claim 3 in which said starting means comprises a resistor connected across one of said controlled rectifiers to substantially short out said controlled rectifier during the starting condition, a pair of resistors connected in series circuit relationship across both of said controlled rectifiers, a capacitor connected in circuit with the other of said controlled rectifiers so as to provide a current pulse when discharged to trigger said other controlled rectifier, said pair of resistors causing a proportional part of the direct current voltage applied at said input terminals to be impressed across said capacitor and to charge it, and switching means connected in circuit with said capacitor to cause said capacitor to be discharged when said switching means is actuated to initiate operation of the inverter circuit.

6 A firing circuit for providing a current pulse to trigger a controlled rectifier comprising a pair of input connections, a first and a second capacitor connected in series circuit relationship across said input connections, a reactor having a primary and a secondary, a resistor connected in series circuit relationship with said primary, said reactor being in tuned circuit relationship with said first capacitor, and said primary and secondary of said reactor being adapted so that when the initial current flowing in said primary is reversed due to the damped oscillation resulting from said tuned circuit relationship a firing pulse is induced in the secondary for triggering said controlled rectifier, said firing pulse being induced after a predetermined interval measured from the instant said input connections are energized.

7. An inverter circuit comprising: a pair of direct current input terminals; a capacitor connected in circuit with said input terminals; a first controlled rectifier and a second controlled rectifier connected in circuit with said input terminals to alternately charge and discharge said capacitor; a pair of output terminals, one of said output terminals being connected in circuit with said capacitor and the other of said output terminals being connected in circuit with said first and second controlled rectifiers, said output terminals being adapted to provide an alternating current supply to a load having a resistive and an inductive portion when said input terminals are energized by a direct current power supply; a first firing circuit including a first reactor having a primary and a secondary winding and a first firing capacitor connected across said primary winding, the secondary winding of said first firing circuit being connected in circuit so as to provide a current pulse to fire one of said controlled rectifiers, and said first firing capacitor and said first reactor comprising a tuned circuit; a second firing circuit including a second reactor having a primary and a secondary winding and a second firing capacitor connected across said primary winding, the secondary winding of said second firing circuit being connected in circuit to provide a current pulse to fire the other controlled rectifier, and said second reactor and said second firing capacitor comprising a tuned circuit; circuit means connecting said first and second firing circuits in circuit with said input and output terminals so as to provide a charging current to said first firing capacitor for an interval during each first half of each cycle of the alternating current flowing through said output terminals and providing a charging current for said second firing capacitor for an interval during each second half of each cycle, said first firing capacitor being discharged by the reversal of polarity of the voltage across said primary winding of said first reactor thereby providing a current pulse in said secondary winding to fire one of said controlled rectifiers and said second firing capacitor being discharged by the reversal of polarity of the voltage across said primary winding of said second firing circuit thereby providing a current pulse in said secondary winding to fire the other of said controlled rectifiers; and starting means for initially firing one of said controlled rectifiers to start operation of said inverter circuit.

8. An inverter circuit comprising: a pair of direct current input terminals; a capacitor connected in circuit with said input terminals; a first controlled rectifier and a second controlled rectifier connected in circuit with said input terminals to alternately charge and discharge said capacitor; a pair of output terminals, one of said output terminals being connected in circuit with said capacitor and the other of said output terminals being connected in circuit with said first and second controlled rectifiers, said output terminals being adapted to provide an alternating current supply to a load having a resistive and an inductive portion when said input terminals are energized by a direct current power supply; a current sensing transformer having a primary and a secondary, said primary being connected in series circuit relationship with said output terminals, a first firing circuit comprising a first capacitor and a first reactor, said first reactor and said first capacitor being associated in tuned circuit relationship, and said secondary of said first reactor being connected in circuit with one of said controlled rectifiers; a second firing circuit comprising a second capacitor and a second reactor having a primary and a secondary, said primary and said second capacitor being associated in tuned circuit relationship and said secondary being connected in circuit with the other of said controlled rectifiers; means connecting said first and second firing circuits across said secondary of said current sensing transformer, said first firing circuit being energized and providing a current pulse in the secondary of said first reactor after a predetermined delay to fire one of said controlled rectifiers when a voltage of a given polarity appears across the secondary of said current sensing transformer and said second firing circuit being energized and providing a current pulse in said secondary of said second reactor to fire the other of said controlled rectifiers after a predetermined delay after a voltage of reverse polarity appears across said secondary of said current sensing transformer.

9. An inverter circuit as set forth in claim 8 in which said current sensing transformer includes a second secondary, a rectifying means connected in circuit with said secondary and said input terminals, said transformer providing a substantial impedance to the flow of current in said primary until the voltage across said secondary equals the voltage impressed across said input terminals.

10. An inverter circuit comprising: a pair of direct current input terminals; at least one capacitor connected in circuit with said input terminals; a pair of controlled rectifiers, each of said rectifiers having an anode, a cathode and a gate electrode, the anode of one of said controlled rectifiers being connected in circuit with one of said input terminals and the cathode of the other of said controlled rectifiers being connected in circuit with the other of said input terminals; a pair of output terminals, one of said output terminals being connected in circuit with at least one of said capacitors and the other of said output terminals being connected in circuit with the cathode of one of said controlled rectifiers and the anode of the other of said controlled rectifiers, said output terminals being adapted to provide an alternating current supply; a first firing circuit comprising a first pair of capacitors connected in series circuit relationship, a first reactor having a primary and a secondary, said first reactor being associated in tuned circuit relationship with one of said first pair of capacitors; a second firing circuit comprising a second pair of capacitors connected in series circuit relationship, a second reactor having a primary and a secondary, said second reactor being associated in tuned circuit relationship with one of said second pair of capacitors, said secondary of said first reactor being connected in circuit with the gate electrode of the other of said controlled rectifiers and said secondary of said second reactor being connected in circuit with the gate electrode of the other of said controlled rectifiers; and circuit means connecting said first and second firing circuits to be alternately energized by providing an initial charging current to said firing capacitors, firing pulses being induced in the secondary windings of said reactors after a predetermined interval measured from the instant said firing circuits are energized.

11. An inverter circuit comprising: a pair of direct current input terminals; a capacitor connected in circuit with said input terminals; a first controlled rectifier and a second controlled rectifier connected in circuit with said input terminals to alternately charge and discharge said capacitor; a pair of output terminals, one of said output terminals being connected in circuit with said capacitor and the other of said output terminals being connected in circuit with said first and second controlled rectifiers, said output terminals being adapted to provide an alternating current supply to a load having a resistive and an inductive portion when said input terminals are energized by a direct current power supply; a firing circuit comprising a pair of reactors, a pair of capacitors connected in circuit with each of said reactors, each of said reactors being associated in tuned circuit relationship with one of said capacitors connected in circuit with it, means coupling said reactors with controlled rectifiers in order to provide current pulses thereto; and means for energizing said firing circuits to alternately charge each of said pairs of capacitors and bring about a damped oscillation in said capacitor and reactor associated in tuned circuit relationship to provide said current pulse to the previously nonconducting of said controlled rectifiers in order to fire it after a predetermined delay.

12. An inverter circuit comprising: a pair of direct current input terminals; at least one capacitor connected across said terminal connection, a first and a second controlled rectifier, each of said rectifiers having an anode, a cathode and a gate, the anode of one of said controlled rectifiers being connected in circuit with one of said direct current input terminals and the cathode of the other of said controlled rectifiers being connected in circuit with the other of said direct current input terminals; a pair of output terminal connections, one of said output terminal connections being connected in circuit with at least one of said capacitors and the other of said output terminals being connected in circuit with the cathode of one of said controlled rectifiers and the anode of the other of said controlled rectifiers, said output connections being adapted to provide an alternating current output to a load having a resistive and an inductive portion; a first firing circuit comprising a first pair of capacitors and a first reactor having a primary and a secondary, said first reactor and one of the capacitors of said first pair of capacitors being associated in tuned circuit relationship and said first reactor being coupled with said gate electrode of one of said second controlled rectifiers; a second firing circuit comprising a second pair of capacitors and a second reactor having a primary and a secondary, said second reactor and one of the capacitors of said second pair of capacitors being associated in tuned circuit relationship and said second reactor being coupled with said gate electrode of the other of said controlled rectifiers, one of said controlled rectifiers being fired by the current pulse induced in the secondary of said first reactor when the polarity of the voltage across said first reactor reverses due to the damped oscillation resulting from the tuned circuit relationship of the capacitor and transformer in said first firing circuit and the other of said controlled rectifiers being fired by the current pulse induced in the secondary of said second reactor when the polarity of the voltage across said second reactor reverses due to the damped oscillation resulting from said tuned circuit relationship of the capacitor and transformer in said second firing circuit.

References Cited in the file of this patent

UNITED STATES PATENTS

| | | |
|---|---|---|
| 1,947,093 | Knowles | Feb. 13, 1934 |
| 2,179,366 | Willis | Nov. 7, 1939 |
| 2,233,416 | Klemperer | Mar. 4, 1941 |
| 2,475,621 | Klemperer | July 12, 1949 |
| 2,523,094 | Carleton | Sept. 19, 1950 |
| 2,563,486 | Potter | Aug. 7, 1951 |
| 2,628,340 | Potter | Feb. 10, 1953 |